(12) United States Patent
Kinjoh et al.

(10) Patent No.: US 12,091,559 B2
(45) Date of Patent: Sep. 17, 2024

(54) CONTINUOUS-TYPE INKJET INK COMPOSITION

(71) Applicant: SAKATA INX CORPORATION, Osaka (JP)

(72) Inventors: Jun Kinjoh, Osaka (JP); Okinori Nakashima, Osaka (JP); Koki Ogasahara, Osaka (JP)

(73) Assignee: SAKATA INX CORPORATION, Osaka (JP)

(*) Notice: Subject to any disclaimer, the term of this patent is extended or adjusted under 35 U.S.C. 154(b) by 1045 days.

(21) Appl. No.: 16/976,443

(22) PCT Filed: Nov. 16, 2018

(86) PCT No.: PCT/JP2018/042573
§ 371 (c)(1),
(2) Date: Aug. 27, 2020

(87) PCT Pub. No.: WO2019/171664
PCT Pub. Date: Sep. 12, 2019

(65) Prior Publication Data
US 2021/0040337 A1   Feb. 11, 2021

(30) Foreign Application Priority Data

Mar. 8, 2018   (JP) .................................. 2018-041683

(51) Int. Cl.
| | |
|---|---|
| C09D 11/106 | (2014.01) |
| B41J 2/02 | (2006.01) |
| C08K 5/05 | (2006.01) |
| C08K 5/07 | (2006.01) |
| C08L 29/14 | (2006.01) |
| C08L 93/04 | (2006.01) |
| C09D 11/033 | (2014.01) |
| C09D 11/32 | (2014.01) |

(52) U.S. Cl.
CPC .............. *C09D 11/106* (2013.01); *B41J 2/02* (2013.01); *C08K 5/05* (2013.01); *C08K 5/07* (2013.01); *C08L 29/14* (2013.01); *C08L 93/04* (2013.01); *C09D 11/033* (2013.01); *C09D 11/32* (2013.01)

(58) Field of Classification Search
CPC ..... C09D 11/106; C09D 11/033; C09D 11/32; C09D 11/08; C09D 11/104; C09D 11/36; B41J 2/02; C08K 5/05; C08K 5/07; C08L 29/14; C08L 93/04; B41M 5/00
See application file for complete search history.

(56) References Cited

U.S. PATENT DOCUMENTS

| | | | |
|---|---|---|---|
| 2002/0100393 A1* | 8/2002 | Moore | C09D 11/36 |
| | | | 106/31.86 |
| 2010/0028632 A1 | 2/2010 | Markem-Imaje | |
| 2012/0058286 A1 | 3/2012 | De Saint-Romain | |
| 2015/0376430 A1 | 12/2015 | Holding | |
| 2020/0079967 A1* | 3/2020 | Xiao | B41J 2/2107 |

FOREIGN PATENT DOCUMENTS

| | | | |
|---|---|---|---|
| EP | 1226972 A2 | 7/2002 | |
| EP | 1228893 A2 | 8/2002 | |
| EP | 3067397 A1 | 9/2016 | |
| JP | H11293166 A | 10/1999 | |
| JP | 2001279138 A | 10/2001 | |
| JP | 2002060661 A | 2/2002 | |
| JP | 2002201393 A | 7/2002 | |
| JP | 2005187745 A | 7/2005 | |
| JP | 2010518214 A | 5/2010 | |
| JP | 2013018939 A | 1/2013 | |
| JP | 2013023636 A | 2/2013 | |
| JP | 2013104010 A | 5/2013 | |
| JP | 2015143287 A | * | 8/2015 |
| JP | 2015151498 A | 8/2015 | |
| WO | 2008000619 A1 | 1/2008 | |

OTHER PUBLICATIONS

English machine translation of JP-2015143287-A (Year: 2015).*
International Search Report (ISR) mailed Feb. 19, 2019, issued for International application No. PCT/JP2018/042573. (2 pages).
Extended European Search Report (EESR) dated Nov. 3, 2021, issued for European counterpart patent application No. EP18908994.9 (6 pages).
A Decision of Rejection issued by the State Intellectual Property Office of China on Jun. 24, 2022, for Chinese counterpart application No. 201880090329.8 (5 pages).
Pencil Manufacturing Technology, 1st edition, 1st printing, edited by the editorial group of Pencil Manufacturing Technology, pp. 786-788, Light Industry Publishing House, Mar. 31, 1987.

(Continued)

*Primary Examiner* — Jennifer A Smith
*Assistant Examiner* — Jeffrey Eugene Barzach
(74) *Attorney, Agent, or Firm* — Law Office of Katsuhiro Arai

(57) ABSTRACT

A continuous-type inkjet ink composition includes a polyvinyl butyral resin (Resin 1) and a rosin ester resin (Resin 2), and organic solvents, wherein the content of Resin 1 in the inkjet ink composition is 1.0 to 8.0 percent by mass, and the content ratio of Resin 1 and Resin 2 satisfies "Resin 1:Resin 2=20:1 to 10:8" based on ratio by mass, and the total quantity of organic solvents regulated by industrial health and safety regulation is 5 percent by mass or less in the inkjet ink composition. The composition demonstrates excellent discharge stability and jetting property as well as excellent adhesion to various types of base printing materials including polyolefin films with no surface treatment.

3 Claims, No Drawings

(56) References Cited

OTHER PUBLICATIONS

Notification Concerning Transmittal of International Preliminary Report on Patentability (PCT/IB/326) and Notification of Transmittal of Translation of the International Preliminary Report on Patentability (PCT/IB/338) mailed Sep. 17, 2020, with International Preliminary Report on Patentability (PCT/IB/373) and Written Opinion of the International Searching Authority (PCT/ISA/237), for corresponding international application PCT/JP2018/042573 (17 pages).

* cited by examiner

CONTINUOUS-TYPE INKJET INK COMPOSITION

CROSS-REFERENCE TO RELATED APPLICATIONS

This application is the U.S. National Phase under 35 U.S.C. § 371 of International Application PCT/JP2018/042573, filed Nov. 16, 2018, which claims priority to Japanese Patent Application No. JP2018-041683, filed Mar. 8, 2018. The International Application was published under PCT Article 21(2) in a language other than English.

TECHNICAL FIELD

The present invention relates to a continuous-type inkjet ink composition that ensures high levels of industrial safety and health, demonstrates excellent discharge stability and jetting property, and further achieves excellent adhesion to various types of base printing materials.

BACKGROUND ART

One of the inkjet printing methods is the continuous method. Under the continuous method, ink droplets are continuously discharged from the nozzle without intermission, and these droplets are selectively distributed to jet toward the base printing material side and collection side (gutter) using the charged electrode and deflecting electrode provided near the jetting path. This enables that only the ink droplets needed to form the image to be printed will land on the base printing material, while the remaining ink droplets will be collected for reuse.

Performance characteristics associated with the continuous method include excellent response and higher printing speed because ink droplets are constantly jetting. Furthermore, structurally the nozzle does not clog easily, which means that higher discharge reliability is achieved compared to other inkjet printing methods even when inks that dry more quickly are used. In other words, the continuous method can prove highly effective in fields where a large quantity of base printing materials are printed on at high speed over a long period of time, as well as in fields where quick-dry inks are needed to print on non-absorbent base printing materials. Currently, therefore, this method is favored primarily in industrial applications.

It is required for such an inkjet printing method to have the following basic performance characteristics—that is, discharge stability or the property of fine ink droplets to discharge continuously without clogging the nozzle, and jetting property or the property of ink droplets to jet straight toward the base printing material and land at intended positions. It should be noted that, regarding the jetting property which is known to be affected significantly by the ink droplet shape, it is important that the droplets are close to spherical so that they can prevent tailing and generation of satellites.

Factors that influence the discharge stability and ink droplet shape include viscosity, fluidity, and surface tension, etc., of the ink. Inks having low viscosity, Newtonian-like flow patterns, and high surface tensions are likely to achieve good discharge stability and jetting property. In addition, the viscosity, fluidity, surface tension, etc., of an ink are affected by which resin is used as a binder, which solvent is used to dissolve the resin, and the interaction between the two. Furthermore, a main feature that spurs utilization in industrial applications is that a great variety of substances, both inorganic and organic, such as metals, ceramics, glass, plastics, etc., can be used as base printing materials. Also, plastics encompass various materials, ranging from polyethylene, polypropylene, and other nonpolar substances to PET, nylon, and other relatively high-polarity substances.

Accordingly, inkjet inks to be printed on these base printing materials are required to have good adhesion to many different materials, in addition to the basic performance characteristics mentioned above. The continuous-type inkjet printing method is drawing particular attention of late because it allows for efficient printing of lot numbers, dates of manufacture, and other simple text. As the applications to which this printing method is adaptable increase, the inks used must ensure adhesion to a wide range of materials not heretofore available.

Conventional methods for obtaining such inkjet ink compositions include, for example, one where at least one type of resin selected from vinyl chloride-vinyl acetate copolymers, amino resins, nitrocelluloses, phenol resins, butyral resins, polyamide resins, rosin-denatured phenol resins, rosin esters, rosin-denatured maleic acid resins, xylene resins, acrylic resins, polyurethane resins, and polyester resins, is actively used under a condition where a good solvent for the resin, such as a ketone solvent, alcohol solvent, alkylene glycol ether solvent, hydrocarbon solvent, ester solvent, or other general organic solvent, can be selected without much limitation (refer to Patent Literature 1, for example). Also proposed are continuous-type inkjet ink compositions that use, for example, a butyral resin having excellent adhesion to glass, metals, and many other base printing materials, as the primary resin (refer to Patent Literature 2, for example).

BACKGROUND ART LITERATURE

Patent Literature

Patent Literature 1: Japanese Patent Laid-open No. Hei 11-293166
Patent Literature 2: Japanese Patent Laid-open No. 2001-279138

SUMMARY OF THE INVENTION

Problems to Be Solved by the Invention

Earlier versions of continuous-type inkjet ink compositions may be classified as organic solvent-containing mixtures because coloring agents and resins are contained in the compositions.

Recently, there is an increasing demand for inks that do not fall under the organic solvents, etc., as defined by the Ordinance on Prevention of Organic Solvent Poisoning, from the viewpoint of ensuring industrial safety and health of workers engaged in printing operations. Here, "organic solvents, etc., as defined by the aforementioned Ordinance" refer to the below-mentioned organic solvents listed in Appended Table 6-2 of the Order for Enforcement of Industrial Safety and Health Act (hereinafter also referred to as "organic solvents in Appended Table 6-2") or organic solvent mixtures consisting thereof. Also, "organic solvent mixtures" refer to mixtures of any of the organic solvents in Appended Table 6-2 and a substance other than such organic solvent, where the organic solvent in Appended Table 6-2 is contained by more than 5 percent by weight of the mixture.

The followings are prescribed in Appended Table 6-2 of the Order for Enforcement of Industrial Safety and Health Act:

1 Acetone
2 Isobutyl alcohol
3 Isopropyl alcohol
4 Isopentyl alcohol (also known as isoamyl alcohol)
5 Ethyl ether
6 Ethylene glycol monoethyl ether (also known as cellosolve)
7 Ethylene glycol monoethyl ether acetate (also known as cellosolve acetate)
8 Ethylene glycol mono-normal-butyl ether (also known as butyl cellosolve)
9 Ethylene glycol monomethyl ether (also known as methyl cellosolve)
10 Ortho-dichlorobenzene
11 Xylene
12 Cresol
13 Chlorobenzene
14 Deleted
15 Isobutyl acetate
16 Isopropyl acetate
17 Isopentyl acetate (also known as isoamyl acetate)
18 Ethyl acetate
19 Normal-butyl acetate
20 Normal-propyl acetate
21 Normal-pentyl acetate (also known as normal-amyl acetate)
22 Methyl acetate
23 Deleted
24 Cyclohexanol
25 Cyclohexanone
26 Deleted
27 Deleted
28 1,2-dichloroethylene (also known as acetylene dichloride)
29 Deleted
30 N,N-dimethyl formamide
31 Deleted
32 Deleted
33 Deleted
34 Tetrahydrofuran
35 1,1,1-trichloroethane
36 Deleted
37 Toluene
38 Carbon disulfide
39 Normal-hexane
40 1-buthanol
41 2-buthanol
42 Methanol
43 Deleted
44 Methyl ethyl ketone
45 Methyl cyclohexanol
46 Methyl cyclohexanone
47 Methyl-normal-butyl ketone
48 Gasoline
49 Coal tar naphtha (including solvent naphtha)
50 Petroleum ether
51 Petroleum naphtha
52 Petroleum benzine
53 Turpentine oil
54 Mineral spirits (including mineral thinner, petroleum spirits, white spirits, and mineral turpentine)
55 Mixtures constituted solely by the substances listed above However, many organic solvents used in ink compositions fall under the organic solvents in Appended Table 6-2. Accordingly, any attempt to satisfy the aforementioned demand reduces the degree of freedom of ink composition design, which makes it more difficult to design ink compositions.

In industrial applications, for example, greater emphasis is placed on printing speed and other measures of work efficiency. Also, achieving high-speed printing requires that inks have quick drying property. However, highly volatile ketone compounds, ester compounds, and most lower alcohols excluding ethanol that are routinely used for these reasons fall under the organic solvents in Appended Table 6-2. Accordingly, designing an ink with the aim of satisfying what is required in terms of industrial safety and health while also achieving quicker drying property normally results in an ink composition that contains a large quantity of ethanol or other hydrocarbon solvent of low boiling point. It should be noted that, although use of special ketone solvents and ester solvents that do not fall under the organic solvents in Appended Table 6-2 is possible, a problem still remains in that these solvents are generally expensive and thus the quantities in which they can be contained are limited from an economic perspective.

From the viewpoint of degree of freedom of ink composition design, a group of solvents containing a large quantity of ethanol presents a considerably higher degree of freedom compared to hydrocarbon solvents of low boiling point. Still, ethanol is a typical high-polarity solvent and reduces the range of selectable resins, etc., that have high solubility to benefit the discharge stability of the ink and formation of its droplets.

For example, acrylic resins, polyurethane resins, polyester resins, vinyl chloride-vinyl acetate resins, etc., are favorably used in the field of inks as binders having good adhesion to various types of base printing materials. However, dissolving any such resin in the aforementioned group of solvents containing a large quantity of ethanol requires a molecular design that adds higher polarity to the resin itself.

On the other hand, the level of polarity of the resin is a factor that directly influences the adhesion to base printing materials. This means that, if this polarity is either too high or too low, the ink's "general utility," or property needed to make the ink applicable to many base printing materials, will inevitably drop. In particular, acrylic resins and polyurethane resins do not normally exhibit good adhesion to polyolefin films and other typical nonpolar base printing materials with no surface treatment. This is because these resins already have ester bonds, urethane bonds, or other polar sites within their molecules, and therefore increasing the polarity of any such resin will only lower the adhesion to the surfaces of nonpolar base printing materials and adversely affect the ink's general utility as a result.

Accordingly, an object of the present invention is to provide a continuous-type inkjet ink composition that, by primarily using organic solvents that do not fall under the organic solvents, etc., as defined by the Ordinance on Prevention of Organic Solvent Poisoning, enhances industrial health and safety of the ink composition while also demonstrating excellent discharge stability and jetting property as well as excellent adhesion to various types of base printing materials including polyolefin films with no surface treatment.

Means for Solving the Problems

The inventors of the present invention first selected, as a binder for the continuous-type inkjet ink composition (hereinafter also referred to simply as "ink composition"), a polyvinyl butyral resin that has good solubility even in the group of organic solvents containing a large quantity of an alcohol solvent (ethanol) that does not fall under the organic solvents in Appended Table 6-2. Then, to confirm the general utility of the ink composition in terms of base printing materials, the inventors evaluated its adhesion to metal, glass, a plastic film whose molecules had polar sites inside and whose surface had been treated by corona discharge (treated PET), and a polypropylene with no surface treatment (untreated OPP). The result found that, even when a polyvinyl butyral resin was used alone as a binder, the obtained ink composition did not have good adhesion to all of the base printing materials and that its adhesion to the untreated OPP was particularly poor.

Also, achieving the level of quick drying property required of an ink composition was difficult even with ethanol having the fastest drying rate among the alcohol solvents that do not fall under the organic solvents in Appended Table 6-2 and, additionally when a dye was used as a coloring agent, the selectable range was reduced in terms of solubility.

Based on these results, the inventors determined that, in terms of binder, improving adhesion to the untreated OPP would inevitably require a combined use of resins meeting this purpose. Also, in terms of organic solvent, the inventors found that using a ketone solvent of fast drying rate would be effective on drying property and dye solubility. Additionally, combining a ketone solvent with an alcohol solvent would also ease the high polarity bias of the solvent and benefit resin solubility.

This led to an evaluation of resins that are commercially available and have a proven track record in the market for use in the field of ink compositions as binders designed primarily to add adhesion with respect to base printing materials, for their solubility in a mixed organic solvent consisting of an alcohol solvent and a ketone solvent; as a result, it was revealed that many of these major types of resins did not dissolve. It is assumed that, since these resins already have difficulty adhering to the untreated OPP, selecting higher polarity varieties to ensure dissolution will not contribute to adhesion after all.

Based on the above assumption, only the resins having solubility in the mixed organic solvent were selected as candidates and used in combination with a polyvinyl butyral resin, as ink composition binders, to produce ink compositions. Evaluating these ink compositions for adhesion to various types of base printing materials led to a gained insight that, among the candidate resins, only the rosin ester resin, when used in combination, contributed to the adhesion to the untreated OPP. Accordingly, a detailed study was conducted further by focusing on a combined use of polyvinyl butyral resin and rosin ester resin. As a result, the inventors designed, by combining a polyvinyl butyral resin with a rosin ester resin at a specific ratio, an ink composition having excellent adhesion to various base printing materials from metal and glass to untreated OPP, and thereby completed the present invention.

To be specific, the present invention relates to (1) a continuous-type inkjet ink composition characterized in that it contains a coloring agent, resins, an alcohol solvent, and a ketone solvent and satisfies Conditions 1 and 2 below:

Condition 1: A polyvinyl butyral resin (Resin 1) and a rosin ester resin (Resin 2) are contained as the resins, where the content of Resin 1 in the inkjet ink composition is 1.0 to 8.0 percent by mass, and the content ratio of Resin 1 and Resin 2 satisfies "Resin 1:Resin 2=20:1 to 10:8" based on ratio by mass.

Condition 2: The total quantity of organic solvents contained that fall under the substances listed below is 5 percent by mass or less in the inkjet ink composition:

Methanol, isopropyl alcohol, isobutyl alcohol, 2-butanol, isopentyl alcohol, cyclohexanol, methyl cyclohexanol, ethylene glycol monomethyl ether, ethylene glycol monoethyl ether, ethylene glycol monoethyl ether acetate, ethylene glycol mono-normal-butyl ether, methyl acetate, ethyl acetate, normal-propyl acetate, isopropyl acetate, normal-butyl acetate, isobutyl acetate, normal-pentyl acetate, isopentyl acetate, acetone, methyl-normal-butyl ketone, cyclohexanone, methyl cyclohexanone, ethyl ether, tetrahydrofuran, petroleum ether, normal-hexane, toluene, xylene, gasoline, petroleum benzine, petroleum naphtha, turpentine oil, mineral spirits (including mineral thinner, petroleum spirits, white spirits and mineral turpentine), coal tar naphtha (including solvent naphtha), 1,2-dichloroethylene, 1,1,1-trichloroethane, chlorobenzene, ortho-dichlorobenzene, cresol, N,N-dimethyl formamide, and carbon disulfide.

Additionally, the present invention relates to (2) the continuous-type inkjet ink composition according to (1), wherein the aforementioned polyvinyl butyral resin is a polyvinyl butyral polymer resin expressed by Formula 1 below:

[Chem. 1]

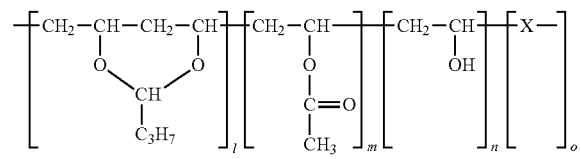

Formula 1

[Here, X represents, when a radical polymerizable monomer other than vinyl acetate is contained as a polymerization component of the polyvinyl butyral resin expressed by Formula 1, the structural unit derived from the molecular structure of the radical polymerizable monomer that does not correspond to the other three structural units. Also, l, m, n, and o each represent an average number of structural units per molecule, where the relationships of "l+m+n+o=300 to 4000, l/(l+m+n+o)=0.50 to 0.90, m/(l+m+n+o)=0 to 0.15, n/(l+m+n+o)=0.05 to 0.50, and o/(l+m+n+o)=0 to 0.20" are satisfied.]

The present invention relates to (3) the continuous-type inkjet ink composition according to (1) or (2) above, wherein ethanol is contained as the alcohol solvent, and at least one type of substance selected from the group that includes diethyl ketone, methyl-n-propyl ketone, and methyl-iso-propyl ketone is contained as the ketone solvent.

The present invention relates to (4) the continuous-type inkjet ink composition according to (3) above, wherein the content of ethanol is 30 percent by mass or higher relative to all organic solvents, and the total content of diethyl ketone, methyl-n-propyl ketone, and methyl-iso-propyl ketone is 30 percent by mass or higher relative to all organic solvents.

Effects of the Invention

The continuous-type inkjet ink composition proposed by the present invention contains a polyvinyl butyral resin and a rosin ester resin at a specific ratio, and additionally the total content therein of the organic solvents listed in Appended Table 6-2 of the Order for Enforcement of Industrial Safety and Health Act is 5 percent by mass or lower relative to the inkjet ink composition.

This way, a continuous-type inkjet ink composition can be provided that represents an ink that ensures high levels of industrial safety and health, while also demonstrating excellent discharge stability and jetting property, as well as excellent adhesion to various types of base printing materials including polyolefin films with no surface treatment.

Mode for Carrying Out the Invention

Coloring Agents

As for the coloring agents that can be used in the continuous-type inkjet ink composition proposed by the present invention, dyes and pigments traditionally used in standard inkjet printing ink compositions may be used.

Here, usable dyes, although not limited in any way, include oil-soluble dyes such as, based on representative hues, C. I. Solvent Black 22, 23, 27, 29, 34, 43, 47, 123; C. I. Solvent Yellow 19, 21, 32, 61, 79, 80, 81, 82; C. I. Solvent Red 8, 35, 83, 84, 100, 109, 118, 119, 121, 122, 160; C. I. Solvent Blue 25, 55, 70, etc.

Additionally, usable pigments, although not limited in anyway, include organic pigments such as dye rake pigments, azo pigments, benzimidazolone pigments, phthalocyanine pigments, quinacridone pigments, anthraquinone pigments, dioxazine pigments, indigo pigments, thioindigo pigments, perylene pigments, perinone pigments, diketopyrrolopyrrole pigments, isoindolinone pigments, nitro pigments, nitroso pigments, anthraquinone pigments, flavanthrone pigments, quinophthalone pigments, pyranthrone pigments, indanthrone pigments, etc. Usable pigments also include inorganic pigments such as carbon black, titanium oxide, red iron oxide, graphite, iron black, chrome oxide green, aluminum hydroxide, etc.

It should be noted that the aforementioned coloring agents may be used directly, or, if they cannot be dissolved or dispersed in the ink composition by using the below-mentioned polyvinyl butyral resin or rosin ester resin as a dispersant, they may be dispersed using other dispersants.

These coloring agents may be used alone, or two or more types may be used in combination. Also, with respect to the continuous-type inkjet ink composition proposed by the present invention, preferably the content of coloring agent is 0.1 to 15 percent by mass in the ink composition. If the content of coloring agent is lower than 0.1 percent by mass, sufficient color density may not be achieved. If the content exceeds 15 percent by mass, on the other hand, the ink may be difficult to use in terms of its viscosity and fluidity.

Resins

Polyvinyl butyral resins that can be used in the continuous-type inkjet ink composition proposed by the present invention can be obtained by reacting a polyvinyl alcohol resin with a butyl aldehyde (n-butyl aldehyde, isobutyl aldehyde, or tert-butyl aldehyde).

The aforementioned polyvinyl alcohol resin is manufactured by saponifying a polyvinyl acetate, ethylene-vinyl acetate copolymer, or other vinyl ester polymer resin using a basic compound, acid compound, etc., where the resin may be completely saponified or partially saponified.

Also, any general method for synthesis may be used to synthesize the polyvinyl butyral resin, such as a method whereby the aforementioned polyvinyl alcohol resin and butyl aldehyde are dissolved or suspended preferably in water, methanol, ethanol, isopropanol, or other lower alcohol, or any mixed solvent consisting thereof, preferably at a content ratio of butyl aldehyde which is equal to or more than the target butyralization degree, and then butyralization reaction is achieved using any known catalyst under heating/pressurization as necessary.

For example, a polyvinyl butyral resin obtained by the aforementioned method using a (partially) saponified polyvinyl acetate (co)polymer as the polyvinyl alcohol resin has, in its molecule, a structural unit constituted by two adjacent saponified sites of the polyvinyl acetate (co)polymer, structural units constituted by unsaponified and saponified parts of the polyvinyl acetate (co)polymer, respectively, and, possibly, a structural unit having other structure, and this polyvinyl butyral resin can be expressed by Formula 1 below:

[Chem. 2]

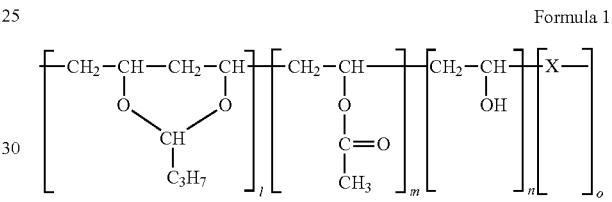

Formula 1

[Here, X represents, when a radical polymerizable monomer other than vinyl acetate is contained as a polymerization component of the polyvinyl butyral resin expressed by Formula 1, the structural unit derived from the molecular structure of the radical polymerizable monomer that does not correspond to the other three structural units. Such structural unit may be ethylene, propylene, alkyl (meth) acrylate, etc. Also, l, m, n, and o each represent an average number of structural units per molecule, where the relationships of "l+m+n+o=300 to 4000, l/(l+m+n+o)=0.50 to 0.90, m/(l+m+n+o)=0 to 0.15, n/(l+m+n+o)=0.05 to 0.50, and o/l+m+n+o)=0 to 0.20" are satisfied.]

For example, in a polyvinyl butyral resin that has been produced by saponifying to a saponification degree of 98 percent an ethylene-vinyl acetate copolymer obtained by copolymerizing vinyl acetate and ethylene at a ratio by mol of 95:5, and then butyralizing the result to a butyralization degree of 95 percent by mol, l≈0.792, m≈0.034, n≈0.084, o≈0.090, and X=—CH$_2$—CH$_2$—.

Preferably the polyvinyl butyral resin used in the continuous-type inkjet ink composition proposed by the present invention satisfies "l+m+n+o=300 to 4000." If the value of l+m+n+o falls below the aforementioned range, a drop in the cohesive force of the resin may cause the adhesion of the ink composition to base printing materials to drop. If this value exceeds the aforementioned range, on the other hand, the solubility of the resin in the organic solvent may drop.

Also, from the viewpoint of achieving desired solubility in a solvent primarily based on an alcohol or ketone that does not fall under the organic solvents in Appended Table 6-2, while also achieving desired adhesiveness to base printing materials, l, m, n, and o in Formula 1 satisfy preferably "l/(l+m+n+o)=0.50 to 0.90," "m/(l+m+n+o)=0 to 0.15," "n/(l+m+n+o)=0.05 to 0.50", and "o/(l+m+n+o)=0 to 0.20," respectively, or more preferably "l/(l+m+n+o)=0.60 to 0.88," "m/(l+m+n+o)=0.01 to 0.12," "n/(l+m+n+o)=0.06 to 0.39", and "o/(l+m+n+o)=0 to 0.1," respectively, or yet more preferably "l/(l+m+n+o)=0.65 to 0.85," "m/(l+m+n+o)=0.02 to 0.10," "n/(l+m+n+o)=0.07 to 0.33", and "o/(l+m+n+o)=0 to 0.1," respectively.

Such polyvinyl butyral resins are commercially available, including, for example, MOWITAL (registered trademark) B Series (manufactured by Kuraray Co., Ltd.), S-LEC (registered trademark) SV Series and B Series (both manufactured by Sekisui Chemical Co., Ltd.), etc., and among these, ones that allow the ink compositions to maintain viscosities appropriate for use under the inkjet method are preferred.

Next, rosin ester resins that can be used in the continuous-type inkjet ink composition proposed by the present invention can be obtained by esterifying a rosin component based on gum rosin, wood rosin, tall oil rosin, polymerized rosin, disproportionated rosin, etc., and an alcohol component such as n-octyl alcohol, 2-ethylhexyl alcohol, decyl alcohol, lauryl alcohol, stearyl alcohol, or other monovalent alcohol, ethylene glycol, diethylene glycol, polyethylene glycol, propylene glycol, dipropylene glycol, polypropylene glycol, neopentyl glycol, or other bivalent alcohol, glycerin, trimethylol propane, or other trivalent alcohol, pentaerythritol, diglycerin, or other tetravalent alcohol, dipentaerythritol, or other hexavalent alcohol, in the presence of any known esterification catalyst, under heating, while removing the water produced by the reaction.

Such rosin ester resins are commercially available, including, for example, PENSEL Series (manufactured by Arakawa Chemical Industries, Ltd.), HARIESTER Series and HARITACK Series (both manufactured by Harima Chemicals Group, Inc.), etc.

The content of the polyvinyl butyral resin (Resin 1) in the continuous-type inkjet ink composition proposed by the present invention is 1.0 to 8.0 percent by mass, or preferably 1.5 to 7.0 percent by mass. If the content of Resin 1 is lower than 1.0 percent by mass, the ink's adhesion to various base printing materials and strength of the ink film itself may drop, while a content exceeding 8.0 percent by mass may lead to lower high-speed discharge property and discharge reliability.

Also, the content ratio of Resin 1 and the rosin ester resin (Resin 2) in the continuous-type inkjet ink composition proposed by the present invention satisfies "Resin 1:Resin 2=20:1 to 10:8," or preferably "Resin 1:Resin 2=1:0.2 to 1:0.7," or more preferably "Resin 1:Resin 2=1:0.2 to 1:0.6," based on ratio by mass. If the content ratio of Resin 1 is either less or more than the aforementioned ranges, the ink's adhesion to polyolefin films, etc., with no surface treatment will drop, which is not desirable.

It should be noted that, while it is optional to also use a styrene acrylic resin, preferably the continuous-type inkjet ink composition does not use any styrene acrylic resin.

Organic Solvents

The continuous-type inkjet ink composition proposed by the present invention contains an alcohol solvent and a ketone solvent as the primary organic solvent components, where the organic solvents listed in Appended Table 6-2 of the Order for Enforcement of Industrial Safety and Health Act or organic solvent mixtures consisting thereof are contained by no more than 5 percent by mass, or preferably these organic solvents are not contained at all, in the ink composition.

First, organic solvents that can be used and do not fall under the solvents in Appended Table 6-2 include ethanol, normal-propanol, diethyl ketone, methyl-n-propyl ketone, methyl-iso-propyl ketone, etc. Additionally, organic solvents that fall under the solvents in Appended Table 6-2 and can be used to the extent that its total quantity does not exceed 5 percent by mass in the ink composition include methanol, isopropanol, normal-butanol, isobutanol, acetone, methyl ethyl ketone, methyl normal-butyl ketone, methyl isobutyl ketone, methyl acetate, ethyl acetate, normal-propyl acetate, isopropyl acetate, normal-butyl acetate, isobutyl acetate, etc.

Furthermore, because high drying property is required of the ink composition, preferably the evaporation rate of any of its organic solvents is 200 or higher based on the evaporation rate of n-butyl acetate being 100. This means that preferably organic solvents whose evaporation rate is 200 or higher are selected and used, where applicable organic solvents among the examples mentioned above include ethanol (evaporation rate 203), diethyl ketone, methyl-n-propyl ketone, methyl-iso-propyl ketone (no literature values on evaporation rate are available for these three types of ketone solvents; estimated from the evaporation rate 465 of methyl ethyl ketone and evaporation rate 145 of methyl isobutyl ketone), methanol (evaporation rate 370), isopropanol (evaporation rate 205), acetone (evaporation rate 720), methyl ethyl ketone (evaporation rate 465), methyl acetate (evaporation rate 1040), ethyl acetate (evaporation rate 525), etc. It should be noted that all of the stated evaporation rates are literature values.

Here, the evaporation rate is obtained according to the measurement method described in ASTM D3539-87, representing a value obtained by measuring the evaporation time of n-butyl acetate and evaporation time of test solvent, at 25° C. in dry air, and then applying the formula below to the results:

{(Time needed for 90 percent by mass of n-butyl acetate to evaporate)/(Time needed for 90 percent by mass of test solvent to evaporate)}×100

Particularly in the interest of obtaining an ink composition that has good drying property, and in order to dissolve the aforementioned resins and minimize economic constraints, preferably ethanol is contained by 30 percent by mass or higher, while diethyl ketone, methyl-n-propyl ketone, and methyl-iso-propyl ketone are contained by a total of 30 percent by mass or higher, relative to the total quantity of organic solvents. Additionally, it is also preferable to increase the total content of both as much as possible.

Also, the aforementioned three types of ketone solvents are characterized in that they are closer to ethanol, than are acetone and methyl ethyl ketone, in terms of evaporation rate. This means that an ink composition containing ethanol and the three types of ketone solvents can prevent changes to the organic solvent makeup more than can an ink composition containing ethanol and acetone or methyl ethyl ketone, even based on a long period of use under the continuous inkjet method that involves turning an ink composition into droplets and causing them to jet repeatedly in air. As a result, deposition of rosin ester resin whose solubility decreases as the content ratio of ethanol increases can be prevented for a longer period of time, which is effective in that the ink's temporal stability under continuous printing improves compared to when acetone or methyl ethyl ketone is used.

It should be noted that, while it is optional to also use an amide compound having the alkoxy group, lactic acid ester, 1,3-dioxolane, 2-methylfuran, or furan as the organic solvent, preferably the continuous-type inkjet ink composition does not use any of these.

Other Materials

If a pigment is used as the aforementioned coloring agent and the pigment cannot be dispersed using the aforementioned polyvinyl butyral resin or rosin ester resin, a pigment dispersant may be used. Such pigment dispersant is not limited in any way so long as it can stably disperse the pigment in the ink composition that contains large quantities of ethanol and diethyl ketone, for example. An effective range of the use quantity of pigment dispersant in maintaining good pigment dispersibility is normally 1 to 200 parts by mass, or preferably 1 to 60 parts by mass, relative to all pigments used representing 100 parts by mass.

Similarly, if a pigment is used as the aforementioned coloring agent, preferably conductivity-adding agent is added to the ink composition to achieve good discharge stability. For this conductivity-adding agent, any conventionally used substance may be used, where specific examples include inorganic salts, hydrochlorides of amines, quaternary ammonium salts and triaryl sulfonium salts whose anions are organic anions, and derivatives thereof, and the like.

Furthermore, additives such as pH-adjusting agent, viscosity-adjusting agent, rustproofing agent, defoaming agent, silicone surface-active agent, fluorine-containing surface-active agent and other surface-active agents, may also be added as necessary.

Methods for Manufacturing Ink Composition

Next, how the continuous-type inkjet ink composition proposed by the present invention is manufactured from the aforementioned constituent materials is explained.

For example, (1) if the coloring agent is a dye, a method may be used, for example, whereby dyes, resins, organic solvents, and various additives as necessary, are put in a sealed container and mixed and dissolved uniformly under agitation, and then filtered through a membrane filter.

Also, (2) if the coloring agent is a pigment, a method may be used, for example, whereby a pigment dispersant is dissolved in a part of organic solvents to make a solution, which is then mixed with the pigment, etc., under agitation and kneaded in a kneading machine to prepare a base ink, after which the remainder of organic solvents in which resins and conductivity-adding agent have been dissolved, as well as other additives as necessary, are added to and mixed with the base ink. In this case, the aforementioned kneading machine may be, for example, a wet circulation mill, bead mill, ball mill, sand mill, attritor, roll mill, agitator, Henschel mixer, colloid mill, ultrasonic homogenizer, ultrahigh-pressure homogenizer, pearl mill, high-pressure dispersion machine, etc. It should be noted that, if the pigment must be dispersed more finely, a wet circulation mill is preferred among the aforementioned machines.

Preferably continuous-type inkjet ink compositions that contain the above coloring agents, resins, organic solvents, and other materials as necessary, and are obtained according to the aforementioned manufacturing method, are set to have a viscosity of approx. 2.0 to 5.0 mPa·s and impedance of approx. $1.2 \times 10^2$ to $1 \times 10^1 \Omega$ as rough guidelines for obtaining desired jetting stability of ink droplets. Here, the viscosity of an ink composition is a value measured by a Type B viscometer at a liquid temperature of 25° C., while the impedance is a value of impedance measured with a Frequency Response Analyzer (FRA) 1255 and Dielectric Measuring Interface 1296 (both manufactured by U.K.'s Solartron Metrology Ltd.) based on an ink composition quantity of 2 ml, under an alternating current of 200 mV in voltage, and in a frequency range of $1 \times 10^3$ to $1 \times 10^6$ Hz.

EXAMPLES

The present invention is explained specifically below using examples; however, the present invention is not limited to these examples. It should be noted that, unless otherwise specified, "part" and "percent" mean "part by mass" and "percent by mass," respectively.

Preliminary Test 1 (Alcohol Solubility Test of Resins)

The following commercial products of vinyl chloride-vinyl acetate copolymer (vinyl chloride acetate) resins, acrylic resins, polyester resins, cellulose resins, styrene maleate resins, and polyvinyl butyral resins were each collected by 0.2 g into a glass bottle, after which 19.8 g of ethanol was added and the bottle was sealed and then shaken by hand for approx. 10 seconds. Based on visual observation, resins that had completely dissolved into a uniform, clear solution were determined as dissolved, while resins in any other condition were determined as insoluble. The results are shown in Table 1.

Indication of Determination Results

◯: Dissolved x: Insoluble

Vinyl Chloride Acetate Resins

TAO: SOLBIN (registered trademark) TAO, manufactured by Nissin Chemical Industry Co., Ltd.

TA5R: SOLBIN (registered trademark) TA5R, manufactured by Nissin Chemical Industry Co., Ltd.

H15/42: VINNOL (registered trademark) H15/42, manufactured by WACKER Chemie AG

E15/45M: VINNOL (registered trademark) E15/45M, manufactured by WACKER Chemie AG Acrylic Resins BR50: DYANAL (registered trademark) BR50, manufactured by Mitsubishi Rayon Co., Ltd.

BR87: DYANAL (registered trademark) BR87, manufactured by Mitsubishi Rayon Co., Ltd.

BR113: DYANAL (registered trademark) BR113, manufactured by Mitsubishi Rayon Co., Ltd.

381N: DEGALAN (registered trademark) PM381N, manufactured by Evonik Industries AG Polyester Resins FC1588: Manufactured by Mitsubishi Rayon Co., Ltd.

FC1565: Manufactured by Mitsubishi Rayon Co., Ltd.

Cellulose Resins

CAB38101: Cellulose Acetate Butyrate (CAB-381-0.1), manufactured by Eastman Chemical Company CAB38105: Cellulose Acetate Butyrate (CAB-381-0.5), manufactured by Eastman Chemical Company CAP48205: Cellulose Acetate Butyrate (CAP-482-0.5), manufactured by Eastman Chemical Company Styrene Maleate Resins 1000: SMA (registered trademark) 1000, manufactured by Cray Valley 2000: SMA (registered trademark) 2000, manufactured by Cray Valley Polyvinyl Butyral Resins B14S: MOWITAL (registered trademark) B14S, manufactured by Kuraray Co., Ltd.

B16M: MOWITAL (registered trademark) B16M, manufactured by Kuraray Co., Ltd.

BL1: S-LEC (registered trademark) BL1, manufactured by Sekisui Chemical Co., Ltd.

BL2: S-LEC (registered trademark) BL2, manufactured by Sekisui Chemical Co., Ltd.

TABLE 1

| Resin | | Determination | Resin | | Determination |
|---|---|---|---|---|---|
| Vinyl chloride acetate resins | TAO | X | Cellulose resins | CAB38101 | X |
| | TA5R | X | | CAB38105 | X |
| | H15/42 | X | | CAP48205 | X |
| | E15/45M | X | Styrene maleate resins | 1000 | X |
| Acrylic resins | BR50 | X | | 2000 | X |
| | BR87 | X | Polyvinyl butyral resins | B14S | ○ |
| | BR113 | X | | B16M | ○ |
| | 381N | X | | BL1 | ○ |
| Polyester resins | FC1588 | X | | BL2 | ○ |
| | FC1565 | X | | | |

Preliminary Test 2 (Adhesion Test on Various Materials)

Adhesion test on various materials was conducted only for the polyvinyl butyral resins that were found soluble in ethanol in Preliminary Test 1 above.

The ethanol solutions of polyvinyl butyral resins B14S and B16M, obtained in Preliminary Test 1, were each coated, using a 0.15-mm Mayer bar, on the surface of each of the materials to be used as base printing materials, and then dried, after which an adhesive cellophane tape (CELLOTAPE (registered trademark), manufactured by Nichiban Co., Ltd.) was adhered and then quickly peeled to evaluate the adhesion according to the evaluation standards below based on the degree of peeling of the resin film from the base printing material. The results are shown in Table 2. It should be noted that the PET film and OPP film used in the examples had their surface treated by corona discharge per a known method only on one side, where the treated surface refers to the surface on the side of the PET or OPP treated by corona discharge, while the untreated surface refers to the surface on the side of the PET or OPP not treated by corona discharge.

Evaluation Standards

A: The peeled area of the resin film is smaller than 10 percent in the region where the adhesive cellophane tape was adhered.
B: The peeled area of the resin film is 10 percent or greater but smaller than 30 percent in the region where the adhesive cellophane tape was adhered.
C: The peeled area of the resin film is 30 percent or greater in the region where the adhesive cellophane tape was adhered.
PET: Biaxially-oriented polyethylene terephthalate film E-5102 (thickness 12 μm), manufactured by Toyobo Co., Ltd.
OPP: Biaxially-oriented polypropylene film PYLEN (registered trademark) P-2161 (thickness 25 μm), manufactured by Toyobo Co., Ltd.
Glass sheet: Commercially available clear glass sheet
SUS: Commercially available stainless (SUS304) sheet

TABLE 2

| | | B14S | B16M |
|---|---|---|---|
| PET | Treated surface | A | C |
| | Untreated surface | B | C |
| OPP | Treated surface | A | B |
| | Untreated surface | C | C |

TABLE 2-continued

| | B14S | B16M |
|---|---|---|
| Glass sheet | A | A |
| SUS | B | C |

Based on the results of Preliminary Test 2, it is determined that, when only a polyvinyl butyral resin exhibiting solubility in ethanol is used as the binder resin component of an ink composition, it would be difficult for the ink composition to have general utility on base printing materials in terms of adhesion.

Preliminary Test 3 (Drying Property Evaluation of Organic Solvents)

The organic solvents listed below were coated on the PET film using a 0.15-mm Mayer bar at room temperature, to measure how long it would take for them to dry completely. The results are shown in Table 3.

Indication of Measured Results

The average value of the results of two measurements was indicated in seconds.

DIPE: Diisopropyl ether (Does not fall under the solvents in Appended Table 6-2)
EtAc: Ethyl acetate (Falls under the solvents in Appended Table 6-2)
MEK: Methyl ethyl ketone (Falls under the solvents in Appended Table 6-2)
DEK: Diethyl ketone (Does not fall under the solvents in Appended Table 6-2)
MNPK: Methyl-n-propyl ketone (Does not fall under the solvents in Appended Table 6-2)
MIPK: Methyl-iso-propyl ketone (Does not fall under the solvents in Appended Table 6-2)
EtOH: Ethanol (Does not fall under the solvents in Appended Table 6-2)
SBAc: Isobutyl acetate (Falls under the solvents in Appended Table 6-2)
NBAc: Normal-butyl acetate (Falls under the solvents in Appended Table 6-2)
PM: Propylene glycol monomethyl ether (Does not fall under the solvents in Appended Table 6-2)
PMAc: Propylene glycol monomethyl ether acetate (Does not fall under the solvents in Appended Table 6-2)

TABLE 3

| | \multicolumn{11}{c}{Organic solvent} | | | | | | | | | | |
|---|---|---|---|---|---|---|---|---|---|---|---|
| | DIPE | EtAc | MEK | DEK | MNPK | MIPK | EtOH | SBAc | NBAc | PM | PMAc |
| Drying property (seconds) | 4.3 | 6.5 | 7.5 | 19.5 | 21.8 | 21.4 | 26.2 | 39.2 | 53.5 | 80.5 | >120 |

Preliminary Test 4 (Solubility Test of Resins and Additives for Adding Adhesion)

The following commercially available terpene phenol resins, rosin derivatives, and fatty acid amide additives that do not bond to other members upon contact and thereby prevent ink films from peeling, which are known to have the effect of adding adhesion with respect to base printing materials, were each collected by 0.2 g into a glass bottle, and after adding 9.9 g of ethanol and 9.9 g of diethyl ketone, the bottle was sealed and shaken by hand for 10 seconds. Based on visual observation, materials that had completely dissolved into a uniform, clear solution were determined as dissolved, while materials in any other condition were determined as insoluble. The results are shown in Table 4.

Indication of Determination Results
◯: Dissolved x: Insoluble

Terpene Phenol Resins
U115: YS POLYSTER (registered trademark) U115, manufactured by Yasuhara Chemical Co., Ltd.
G125: YS POLYSTER (registered trademark) G125, manufactured by Yasuhara Chemical Co., Ltd.
K125: YS POLYSTER (registered trademark) K125, manufactured by Yasuhara Chemical Co., Ltd.

Rosin Ester Resins
D125: PENSEL (registered trademark) D125, manufactured by Arakawa Chemical Industries, Ltd.
D135A: PENSEL (registered trademark) D135, manufactured by Arakawa Chemical Industries, Ltd.
PCJ: HARITACK (registered trademark) PCJ, manufactured by Harima Chemicals, Inc.

Amide Additives
AP-1: AMIDE AP-1, manufactured by Nippon Kasei Chemical Co., Ltd.
O-200T: DIAMID (registered trademark) O-200T, manufactured by Nippon Kasei Chemical Co., Ltd.
L-200: DIAMID (registered trademark) L-200, manufactured by Nippon Kasei Chemical Co., Ltd.
SO-1: NIKKA AMIDE (registered trademark) SO-1, manufactured by Nippon Kasei Chemical Co., Ltd.
R-200NPA: A-S-A R-200NPA, manufactured by Itoh Oil Chemicals Co., Ltd.

rosin ester resins (D125, D135A, PCJ), and amide additive (R-200NPA) were selected as adhesion-imparting components, and ethanol, diethyl ketone, as well as ethyl acetate and isopropyl alcohol that fall under the solvents in Appended Table 6-2 but are relatively less hazardous, were selected as organic solvents.

Preparation of Ink Compositions in Examples 1 to 14 and Comparative Examples 1 to 10

To mixed organic solvents in which the specified quantities of organic solvents according to the chemical makeups in Tables 5 and 6 were mixed, the dye, polyvinyl butyral resin, and adhesion-imparting components were added, and then mixed under agitation using a high-speed agitator, to prepare the ink compositions in Examples 1 to 14 and Comparative Examples 1 to 10. It should be noted that Solvent Black 29, which is a black dye, was used as the coloring agent.

Evaluation of Ink Compositions in Examples 1 to 14 and Comparative Examples 1 to 10

Adhesion Test

The ink compositions in Examples 1 to 14 and Comparative Examples 1 to 10 were each coated, using a 0.15-mm Mayer bar, on the surface of each of the materials to be used as base printing materials, and then dried, after which an adhesive cellophane tape (CELLOTAPE (registered trademark), manufactured by Nichiban Co., Ltd.) was adhered and then quickly peeled to evaluate the adhesion according to the evaluation standards below based on the degree of peeling of the resin film from the base printing material.

Evaluation Standards

A: The peeled area of the resin film is smaller than 10 percent in the region where the adhesive cellophane tape was adhered.
B: The peeled area of the resin film is 10 percent or greater but smaller than 30 percent in the region where the adhesive cellophane tape was adhered.

TABLE 4

| Material | | Determination | Material | | Determination |
|---|---|---|---|---|---|
| Terpene phenol resins | U115 | X | Amide additives | AP-1 | X |
| | G125 | X | | O-200T | X |
| | K125 | X | | L-200 | X |
| Rosin ester resins | D125 | ◯ | | SO-1 | X |
| | D135A | ◯ | | R-200NPA | ◯ |
| | PCJ | ◯ | | | |

Based on the results of Preliminary Tests 1 to 4 above, a polyvinyl butyral resin (B14S) was selected as a primary binder resin, terpene phenol resins (U115, G125, K125), C: The peeled area of the resin film is 30 percent or greater in the region where the adhesive cellophane tape was adhered.

Dischargeability

The ink compositions in Examples 1 to 14 and Comparative Examples 1 to 10 were printed on the OPP film (P-2161, 25 μm, manufactured by Toyobo Co., Ltd.) by operating a continuous inkjet printer (A300, manufactured by Comes Technologies Limited) continuously for 100 hours at room temperature.

A: Text was printed clearly until the end of 100 hours of continuous operation.

B: At least some of printed text was difficult to read visually.

TABLE 5

| | | | Examples | | | | | | |
|---|---|---|---|---|---|---|---|---|---|
| | | | 1 | 2 | 3 | 4 | 5 | 6 | 7 |
| Coloring agent | | | 9 | 9 | 9 | 9 | 9 | 9 | 9 |
| Polyvinyl butyral resin | | | 1 | 1.5 | 5 | 5 | 5 | 5 | 5 |
| Adhesive components | D125 | | — | — | — | 1 | — | — | 3.5 |
| | D135A | | 0.1 | — | 0.5 | — | — | 2.5 | — |
| | PCJ | | — | 1 | — | — | 1.5 | — | — |
| | U115 | | — | — | — | — | — | — | — |
| | G125 | | — | — | — | — | — | — | — |
| | K115 | | — | — | — | — | — | — | — |
| | R-200NPA | | — | — | — | — | — | — | — |
| Organic solvents | EtOH | | 44.9 | 44.2 | 42.7 | 42.5 | 42.2 | 41.7 | 41.2 |
| | DEK | | 45 | 44.3 | 42.8 | 42.5 | 42.3 | 41.8 | 41.3 |
| | MNPK | | — | — | — | — | — | — | — |
| | MIPK | | — | — | — | — | — | — | — |
| | EtAc | | — | — | — | — | — | — | — |
| | IPA | | — | — | — | — | — | — | — |
| Total | | | 100 | 100 | 100 | 100 | 100 | 100 | 100 |
| Adhesion | PET | Treated surface | A | A | A | A | A | A | A |
| | | Untreated surface | A | A | A | A | A | A | A |
| | OPP | Treated surface | A | A | A | A | A | A | A |
| | | Untreated surface | B | A | A | A | A | A | B |
| | Glass sheet | | A | A | A | A | A | A | A |
| | SUS | | B | A | A | A | A | A | A |
| Dischargeability | | | A | A | A | A | A | A | A |

| | | | Examples | | | | | | |
|---|---|---|---|---|---|---|---|---|---|
| | | | 8 | 9 | 10 | 11 | 12 | 13 | 14 |
| Coloring agent | | | 9 | 9 | 9 | 9 | 9 | 9 | 9 |
| Polyvinyl butyral resin | | | 5 | 5 | 5 | 5 | 5 | 4 | 7 |
| Adhesive components | D125 | | — | 1.5 | — | 1.5 | — | 0.2 | 5 |
| | D135A | | 1.5 | — | 1.5 | — | 1.5 | — | — |
| | PCJ | | — | — | — | — | — | — | — |
| | U115 | | — | — | — | — | — | — | — |
| | G125 | | — | — | — | — | — | — | — |
| | K115 | | — | — | — | — | — | — | — |
| | R-200NPA | | — | — | — | — | — | — | — |
| Organic solvents | EtOH | | 42.2 | 42.2 | 42.2 | 40.2 | 40.2 | 43.4 | 39.5 |
| | DEK | | 42.3 | — | — | 40.3 | 40.3 | 43.4 | 39.5 |
| | MNPK | | — | 42.3 | — | — | — | — | — |
| | MIPK | | — | — | 42.3 | — | — | — | — |
| | EtAc | | — | — | — | 4 | — | — | — |
| | IPA | | — | — | — | — | 4 | — | — |
| Total | | | 100 | 100 | 100 | 100 | 100 | 100 | 100 |
| Adhesion | PET | Treated surface | A | A | A | A | A | A | A |
| | | Untreated surface | A | A | A | A | A | B | A |
| | OPP | Treated surface | A | A | A | A | A | A | A |
| | | Untreated surface | A | A | A | A | A | B | B |
| | Glass sheet | | A | A | A | A | A | A | A |
| | SUS | | A | A | A | A | A | A | A |
| Dischargeability | | | A | A | A | A | A | A | A |

TABLE 6

| | | | Comparative Examples | | | | | | | | | |
|---|---|---|---|---|---|---|---|---|---|---|---|---|
| | | | 1 | 2 | 3 | 4 | 5 | 6 | 7 | 8 | 9 | 10 |
| Coloring agent | | | 9.0 | 9.0 | 9.0 | 9.0 | 9.0 | 9.0 | 9.0 | 9.0 | 9.0 | 9.0 |
| Polyvinyl butyral resin | | | 5.0 | 5.0 | 5.0 | 5.0 | 5.0 | 0.5 | 9.0 | 7.0 | 5.0 | 5.0 |
| Adhesive components | D125 | | — | — | — | — | — | 0.3 | — | — | — | 1.5 |
| | D135A | | — | — | — | — | — | — | 1.0 | — | 1.5 | — |
| | PCJ | | — | — | — | — | — | — | — | 6.0 | — | — |
| | U115 | | — | 1.5 | — | — | — | — | — | — | — | — |
| | G125 | | — | — | 1.5 | — | — | — | — | — | — | — |
| | K115 | | — | — | — | 1.5 | — | — | — | — | — | — |
| | R-200NPA | | — | — | — | — | 1.5 | — | — | — | — | — |
| Organic solvents | EtOH | | 43.0 | 42.2 | 42.1 | 42.2 | 42.2 | 45.1 | 40.5 | 39.0 | 39.2 | 39.2 |
| | DEK | | 43.0 | 42.3 | 42.2 | 42.3 | 42.3 | 45.1 | 40.5 | 39.0 | 39.3 | 39.3 |
| | MNPK | | — | — | — | — | — | — | — | — | — | — |
| | MIPK | | — | — | — | — | — | — | — | — | — | — |
| | EtAc | | — | — | — | — | — | — | — | — | 6.0 | — |
| | IPA | | — | — | — | — | — | — | — | — | — | 6.0 |
| Total | | | 100 | 100 | 100 | 100 | 100 | 100 | 100 | 100 | 100 | 100 |
| Adhesion | PET | Treated surface | A | A | A | A | A | B | A | A | A | A |
| | | Untreated surface | B | A | B | B | B | C | A | B | A | A |
| | OPP | Treated surface | A | A | A | A | A | B | A | A | A | A |
| | | Untreated surface | C | C | C | C | C | C | A | C | A | A |
| | Glass sheet | | A | A | A | A | A | B | A | A | A | A |
| | SUS | | B | A | A | B | B | C | A | A | A | A |
| Dischargeability | | | A | A | A | A | A | A | B | A | A | A |

Temporal Stability Test of Ink under Continuous Printing

To mixed organic solvents in which the specified quantities of organic solvents according to the chemical makeups in Table 7 were mixed, the polyvinyl butyral resin and rosin ester resin were added, and then mixed under agitation using a high-speed agitator, to prepare Temporal Stability Evaluation Compositions 1 to 4. Temporal Stability Evaluation Compositions 1 to 4 were each collected by 200 ml onto a glass plate having an opening area of approx. 78.5 cm$^2$, and then agitated with a magnet stirrer and rotator at a rotating speed of 400 rpm in an environment of 30° C. in ambient temperature and 50 percent in relative humidity, to measure how long it would take for the rosin ester resin to deposit.

Evaluation Standards

The following is a possible cause of why the rosin ester resin deposits: because the content ratio of ethanol and ketone solvents when each composition is prepared is 50:50, the rosin ester resin is soluble in an early stage of the test; as the organic solvents evaporate, however, the content ratio of ethanol whose evaporation rate is lower increases, and the rosin ester resin becomes insoluble. Therefore, the aforementioned method was determined effective in simulating in a simple manner reproducing changeability of the state of an ink over time under continuous printing, and accordingly Temporal Stability Evaluation Compositions 2 to 4 were evaluated for temporal stability, by relative value comparison, based on the times it took for the rosin ester resin to deposit in them versus the time it took for the rosin ester resin to deposit in Temporal Stability Evaluation Composition 1 representing 100.

As a result, the aforementioned relative values of Temporal Stability Evaluation Compositions 2 and 3 were 103 and 104, respectively, and therefore their temporal stability was evaluated as equivalent to that of Temporal Stability Evaluation Composition 1. In contrast, the relative value of Temporal Stability Evaluation Composition 4 was below 80, and therefore its temporal stability was evaluated as lower than that of Temporal Stability Evaluation Composition 1.

TABLE 7

| | | Temporal Stability Evaluation Compositions | | | |
|---|---|---|---|---|---|
| | | 1 | 2 | 3 | 4 |
| Polyvinyl butyral resin | | 5.5 | 5.5 | 5.5 | 5.5 |
| Rosin ester resin | D125 | 1.6 | 1.6 | 1.6 | 1.6 |
| Organic solvents | EtOH | 46.4 | 46.4 | 46.4 | 46.4 |
| | DEK | 46.5 | — | — | — |
| | MNPK | — | 46.5 | — | — |
| | MIPK | — | — | 46.5 | — |
| | DMK | — | — | — | 46.5 |
| Total | | 100 | 100 | 100 | 100 |
| Temporal stability | | 100 | 103 | 104 | <80 |

DMK: Acetone (Falls under the solvents in Appended Table 6-2)

Materials Used in Examples

Polyvinyl Butyral Resin
B145
l/(l+m+n+o)=67.5 to 75.2, m/(l+m+n+o)=3.8 to 6.0, n/(l+m+n+o)=21.0 to 26.5, o/(l+m+n+o)=0, Tg=60° C.

[Chem. 3]

Formula 1

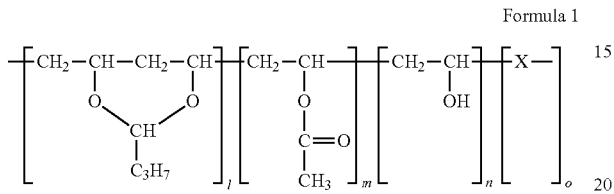

Rosin Ester Resins
D125
Esterified product of polymerized rosin and pentaerythritol, acid value 20 mgKOH/g or lower, softening point 120 to 130° C.
D135A
Esterified product of polymerized rosin and pentaerythritol, acid value 10 to 16 mgKOH/g, softening point 130 to 140° C.
PCJ
Polymerized rosin ester compound, acid value 16 mgKOH/g or lower, softening point 118 to 128° C.

As explained by the preliminary tests and the evaluation tests of Examples and Comparative Examples, it can be argued that the continuous-type inkjet ink compositions in Examples 1 to 14 that conform to the present invention ensure high levels of industrial safety and health because they do not contain any of the organic solvents listed in Appended Table 6-2 of the Order for Enforcement of Industrial Safety and Health Act by more than 5 percent by mass in the ink composition, and therefore do not fall under the organic solvents, etc., as defined by the Ordinance on Prevention of Organic Solvent Poisoning. Additionally, these continuous-type inkjet ink compositions demonstrate excellent discharge stability and jetting property, as well as excellent adhesion to various types of base printing materials including polyolefin films with no surface treatment, which means that they have good printability and high general utility.

Also, surprisingly, inkjet printing could be performed smoothly using these continuous-type inkjet ink compositions even when EtOH and DEK requiring a relatively longer drying time were used, and EtAc and IPA associated with a quick drying time were contained by smaller quantities.

In contrast, sufficient adhesion was not achieved, particularly to untreated OPP surfaces, under Comparative Examples 1 to 5 not containing rosin ester resin, Comparative Example 6 containing a smaller quantity of polyvinyl butyral resin, and Comparative Example 8 having an excessively high content ratio of rosin ester resin relative to polyvinyl butyral resin.

Also, Comparative Example 7 containing an excessive quantity of polyvinyl butyral resin resulted in poor dischargeability. Additionally, Comparative Examples 9 and 10 containing an excessive quantity of EtAc and isopropyl alcohol, respectively, failed, while achieving excellent adhesion and dischargeability, to meet the regulation relating to organic solvents. Also, according to the present invention, ink compositions were obtained that demonstrate an equivalent level of excellent dischargeability to the organic solvents that do not meet the regulation on organic solvents, but offer excellent dischargeability.

What is claimed is:

1. A continuous-type inkjet ink composition characterized by containing a coloring agent, resins, ethanol as an alcohol solvent, and a ketone solvent, and satisfying Conditions 1 and 2 below:
   Condition 1: A polyvinyl butyral resin (Resin 1) and a rosin ester resin (Resin 2) are contained as the resins, where a content of Resin 1 in the inkjet ink composition is 1.0 to 8.0 percent by mass, and a content ratio of Resin 1 and Resin 2 satisfies "Resin 1:Resin 2=1:0.2 to 1:0.7" based on ratio by mass;
   Condition 2: A total quantity of organic solvents contained that fall under substances listed below is 5 percent by mass or less in the inkjet ink composition:
   Methanol, isopropyl alcohol, isobutyl alcohol, 2-butanol, isopentyl alcohol, cyclohexanol, methyl cyclohexanol, ethylene glycol monomethyl ether, ethylene glycol monoethyl ether, ethylene glycol monoethyl ether acetate, ethylene glycol mono-normal-butyl ether, methyl acetate, ethyl acetate, normal-propyl acetate, isopropyl acetate, normal-butyl acetate, isobutyl acetate, normal-pentyl acetate, isopentyl acetate, acetone, methyl-normal-butyl ketone, cyclohexanone, methyl cyclohexanone, ethyl ether, tetrahydrofuran, petroleum ether, normal-hexane, toluene, xylene, gasoline, petroleum benzine, petroleum naphtha, turpentine oil, mineral spirits (including mineral thinner, petroleum spirits, white spirits and mineral turpentine), coal tar naphtha (including solvent naphtha), 1,2-dichloroethylene, 1,1,1-trichloroethane, chlorobenzene, ortho-dichlorobenzene, cresol, N,N-dimethyl formamide, methyl ethyl ketone, and carbon disulfide;
   wherein a content of ethanol is 30 percent by mass or higher relative to all organic solvents,
   wherein at least one substance selected from the group consisting of diethyl ketone, methyl-n-propyl ketone, and methyl-iso-propyl ketone is contained as the ketone solvent, and
   wherein a total content of diethyl ketone, methyl-n-propyl ketone, and methyl-iso-propyl ketone as the ketone solvent is 30 percent by mass or higher relative to all organic solvents.

2. The continuous-type inkjet ink composition according to claim 1, wherein the polyvinyl butyral resin is a polyvinyl butyral polymer resin expressed by Formula 1 below:

Formula 1

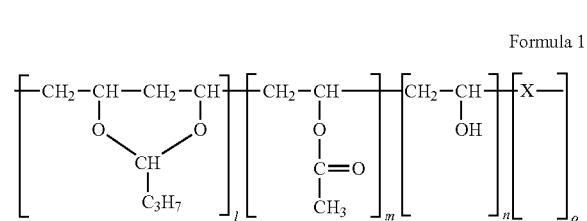

wherein X represents, when a radical polymerizable monomer other than vinyl acetate is contained as a polymerization component of the polyvinyl butyral resin expressed by Formula 1, a structural unit derived from a molecular structure of the radical polymerizable monomer that does not correspond to other three structural units; and l, m, n and o each represent an average number of structural units per molecule, where relationships of "l+m+n+o=300 to 4000, l/(l+m+n+0)=0.50 to 0.90, m/(l+m+n+o)=0 to 0.15, n/(l+m+n+o)=0.05 to 0.50, and o/(l+m+n+o)=0 to 0.20" are satisfied.

3. A continuous-type inkjet ink composition characterized by containing a coloring agent, resins, ethanol as an alcohol solvent, and a ketone solvent, and satisfying Conditions 1 and 2 below: Condition 1: A polyvinyl butyral resin (Resin 1) and a rosin ester resin (Resin 2) are contained as the resins, where a content of Resin 1 in the inkjet ink composition is 1.0 to 8.0 percent by mass, and a content ratio of Resin 1 and Resin 2 satisfies "Resin 1:Resin 2=1:0.2 to 1:0.7" based on ratio by mass;

Condition 2: A total quantity of organic solvents contained that fall under substances listed below is 5 percent by mass or less in the inkjet ink composition:

Methanol, isopropyl alcohol, isobutyl alcohol, 2-buthanol, isopentyl alcohol, cyclohexanol, methyl cyclohexanol, ethylene glycol monomethyl ether, ethylene glycol monoethyl ether, ethylene glycol monoethyl ether acetate, ethylene glycol mono-normal-butyl ether, methyl acetate, ethyl acetate, normal-propyl acetate, isopropyl acetate, normal-butyl acetate, isobutyl acetate, normal-pentyl acetate, isopentyl acetate, acetone, methyl-normal-butyl ketone, cyclohexanone, methyl cyclohexanone, ethyl ether, tetrahydrofuran, petroleum ether, normal-hexane, toluene, xylene, gasoline, petroleum benzine, petroleum naphtha, turpentine oil, mineral spirits (including mineral thinner, petroleum spirits, white spirits and mineral turpentine), coal tar naphtha (including solvent naphtha), 1,2-dichloroethylene, 1,1,1-trichloroethane, chlorobenzene, ortho-dichlorobenzene, cresol, N,N-dimethyl formamide, methyl ethyl ketone, and carbon disulfide;

wherein a content of ethanol is 30 percent by mass or higher relative to all organic solvents, and wherein no methyl acetate is contained as an organic solvent in the inkjet ink composition.

* * * * *